Patented June 3, 1930

1,760,922

UNITED STATES PATENT OFFICE

WILLIAM H. TEST, OF REDONDO BEACH, CALIFORNIA

COMPOSITION OF MATTER

No Drawing.  Application filed April 5, 1927. Serial No. 181,285.

This invention relates to a composition of matter and it is a general object of the invention to provide a composition of fine texture and having wear resisting properties.

Compositions have been proposed and used containing hard materials. These compositions have been used generally for cutting or polishing and have been more or less limited in their application, due to certain limitations in connection with the hard materials available. For example, the hard materials heretofore used have been comparatively coarse and, because of their hard, wear resisting qualities, have made fine grinding commercially impractical. Further, the particles of these materials are so large at their smallest possible commercial comminution as to present hard, sharp edges which cause them to cut and deteriorate the structure of the composition into which they enter. As an example of hard materials that have been used in various compositions, I will refer to emery and carborundum.

An object of my present invention is to provide a composition of fine texture and having wear resisting qualities.

Another object of the invention is to provide a composition in which the hard element is very much finer than the materials heretofore used in such compositions and which lends itself to many commercial applications.

It is another object of my invention to provide a composition of the character mentioned containing a hard, wear resisting material, the individual particles of which are very small.

Another object of my invention is to provide a composition of the character mentioned including a hard, wear resisting element in the form of very fine particles and capable of being commercially and practically mechanically combined with a wide variety of other materials such as may bind the particles together, give a resilient body, etc.

Another object of this invention is to provide a composition of a hard wearing material and a binder in which the hard material is so finely divided that it forms a homogeneous mass with the binder and maintains in the composition a resiliency and pliability characteristic of the binder.

For purpose of example, I will set forth in detail one typical form and application of my invention and will describe one composition which will serve to give an understanding of the invention and will make clear a practical application thereof. In view of the fact that the invention may be carried out in many forms and under many varying conditions, I do not wish to limit myself to any specific application, such as I am about to describe, and, therefore, do not wish the following detailed description to be construed as a limitation on the invention.

The composition provided by my present invention includes, generally, a hard titanium compound and a binder. In carrying out my invention, I may use a wide variety of materials as binders with or for the titanium compound. As an example of one class of binders, I will refer to rubber pure or compounded with other materials. When I use the term "rubber," I use it in its broadest sense and mean to include those various compounds or compositions having the characteristics of rubber or that may be used in substitution for rubber.

My invention provides, generally, for the compounding of the binder or rubber with hard nitrogen compounds, such as zirconium, silicon, and titanium nitrides. As an example, I will refer specifically to titanium nitrides. In accordance with the invention, various titanium nitrides may be used. For example, I may use a compound of titanium and nitrogen corresponding to the general formula TiN or Ti2N$_3$. I may use a cyanonitride, that is, a compound of titanium, nitrogen and carbon. The latter compounds of titanium, nitrogen and carbon, known generally as cyanonitrides, vary according to the methods of manufacture employed. I may define the titanium compounds contemplated by my invention as those which are hard and, therefore, wear resisting.

The titanium compounds I mention above as being particularly suited for use in carrying out my invention, are capable of being produced commercially and, as produced by the processes now developed, the particles are very finely divided and are suitable for direct use in my composition. In practice, I prefer to use a nitrogen compound having a fineness approaching a colloidal state. This degree of fineness is obtained in the course of manufacture by finely dividing the comparatively soft material from which the nitride is produced and then treating it to form the nitride. The particles of titanium nitride, in addition to being very fine, are extremely hard.

In carrying out my invention under ordinary conditions, the titanium compound may be used in place of, or in addition to, the fillers ordinarily used in rubber, and it may be used in varying quantities. It will be apparent that the quantity of titanium compound to be used in any particular case will depend upon numerous factors, such as the character of the rubber entering into the composition, the use to which the composition is to be put, etc. As an example, I will refer to my composition as being particularly useful and practical for the tread of a motor vehicle tire, and, in such application, I may state that from one to two pounds of titanium compound may be advantageously used in the tread of an average motor vehicle tire.

I may point out further than the componding of a titanium compound with rubber not only adds to the wearing quality of the rubber, but also, through the well-known characteristics of this class of titanium compounds, retards oxidation and thus prolongs the life of the composition.

In making or handling my composition, the desired amount of the desired titanium compound is mixed with the rubber and whatever materials are to be incorporated in the ultimate compound, and the mixture is then placed in the desired molds and is vulcanized, or is otherwise cured, producing the finished composition.

The finished composition provided by my invention possesses unusual wearing qualities, due to the presence of the hard titanium compond, thus making it useful in various situations in which rubber is not ordinarily employed because of its failure to withstand wear. Further, as above stated, the composition is durable, as well as wear resisting, and will resist oxidation, due to the characteristic action of the titanium compound present.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:

1. A composition of matter including a hard finely divided metallic nitride and a resilient organic binder.

2. A composition of matter including a finely divided titanium nitride and a resilient organic binder.

3. A composition of matter including a hard finely divided metallic nitride and a binder having the general characteristics of rubber.

4. A composition of matter including a compound of nitrogen and titanium and a binder having the general characteristics of rubber.

5. A composition of matter including a hard titanium nitride and a vulcanized rubber binder.

In witness that I claim the foregoing I have hereunto subscribed my name this 30th day of March, 1927.

WILLIAM H. TEST.